(12) United States Patent
MacNeil et al.

(10) Patent No.: US 11,648,865 B2
(45) Date of Patent: May 16, 2023

(54) VEHICLE CUPHOLDER ADAPTER FOR OVERSIZED BEVERAGE CONTAINER

(71) Applicant: MACNEIL IP LLC, Bolingbrook, IL (US)

(72) Inventors: David F. MacNeil, Fort Lauderdale, FL (US); Anne Crawford, Geneva, IL (US); Ryan Granger, Lemont, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 136 days.

(21) Appl. No.: 17/240,547

(22) Filed: Apr. 26, 2021

(65) Prior Publication Data
US 2021/0245646 A1    Aug. 12, 2021

Related U.S. Application Data

(63) Continuation-in-part of application No. 16/791,121, filed on Feb. 14, 2020, now Pat. No. 11,038,996, which is a continuation-in-part of application No. 16/573,063, filed on Sep. 17, 2019, now Pat. No. 10,576,905, which is a continuation-in-part of application No. 16/172,826, filed on Oct. 28, 2018, now Pat. No. 10,717,396.

(51) Int. Cl.
*B60N 3/10*    (2006.01)
(52) U.S. Cl.
CPC ............. *B60N 3/103* (2013.01); *B60N 3/107* (2013.01)
(58) Field of Classification Search
CPC .. A45F 2200/0583; A61J 1/165; A47G 23/02; A47G 220/737; B60N 3/103; B60N 3/107

USPC ..................................................... 455/575.1
See application file for complete search history.

(56) References Cited

U.S. PATENT DOCUMENTS

| D246,086 S | 10/1977 | Graves |
| D289,898 S | 5/1987 | Miller |
| 5,088,673 A | 2/1992 | Chandler |
| 5,174,534 A | 12/1992 | Mitchell |
| D332,891 S | 2/1993 | Cumberland |
| D338,556 S | 8/1993 | McNamara |
| D338,597 S | 8/1993 | Dickey |
| 5,285,953 A | 2/1994 | Smith |
| D361,017 S | 8/1995 | Keven |
| D377,091 S | 12/1996 | Scott |
| 5,676,340 A | 10/1997 | Ruhnau |
| 5,745,565 A | 4/1998 | Wakefield |
| D395,097 S | 6/1998 | Barton |
| D397,915 S | 9/1998 | McNaughton |
| D400,763 S | 11/1998 | Taylor |

(Continued)

*Primary Examiner* — Huy C Ho
(74) *Attorney, Agent, or Firm* — Perkins IP Law Group LLC; Jefferson Perkins (57) ABSTRACT

A cupholder adapter for a large beverage container has a base, a container holder that upwardly extends from the base, and a shell insert that extends downwardly from the base. The shell insert snaps into a first shell, which may be press-fit into OEM vehicle cupholders of a relatively small size. Further shells may be sequentially and releasably attached over the first shell to fit the assembly to OEM vehicle cupholders of larger sizes. An axis of the container holder may be offset from the axis of the shell insert, so as to permit two such cupholder adapters to be installed in two cupholders closely spaced from each other in a vehicle center console.

18 Claims, 9 Drawing Sheets

(56) References Cited

U.S. PATENT DOCUMENTS

| | | |
|---|---|---|
| D402,666 S | 12/1998 | Golder |
| D407,408 S | 3/1999 | Hoff |
| 5,897,041 A | 4/1999 | Ney |
| D439,116 S | 3/2001 | White |
| 6,246,766 B1 | 6/2001 | Walsh |
| 6,253,982 B1 | 7/2001 | Gerardi |
| 6,267,340 B1 | 7/2001 | Wang |
| D447,024 S | 8/2001 | Thomas |
| 6,315,153 B1 | 11/2001 | Osborn |
| D451,504 S | 12/2001 | Edwards |
| D452,236 S | 12/2001 | Kohli |
| D453,095 S | 1/2002 | Bailey |
| D455,225 S | 4/2002 | Whitlock |
| D475,044 S | 5/2003 | Kohli |
| D478,073 S | 8/2003 | Topinka |
| D524,807 S | 7/2006 | Topinka |
| 7,099,466 B2 | 8/2006 | Walsh |
| 7,099,467 B1 | 8/2006 | Rohrbach |
| 7,140,586 B2 | 11/2006 | Seil |
| 7,708,247 B2 | 5/2010 | Lota |
| D631,699 S | 2/2011 | Moreau |
| D658,922 S | 5/2012 | Fallon |
| D714,594 S | 10/2014 | Blandi |
| 8,922,354 B2 | 12/2014 | Nagara |
| 9,162,630 B2 | 10/2015 | Pluta |
| D777,720 S | 1/2017 | Russell |
| D798,673 S | 10/2017 | Gilmore |
| 9,987,993 B2 | 6/2018 | Thorimbert |
| D835,113 S | 12/2018 | Kim |
| 10,155,482 B2 | 12/2018 | Corso |
| D877,045 S | 3/2020 | Johnson |
| D906,229 S | 12/2020 | Han |
| D913,201 S | 3/2021 | Jia |
| D918,645 S | 5/2021 | Swidler |
| D938,342 S | 12/2021 | Yang |
| 2002/0049081 A1 | 4/2002 | Heininger |
| 2002/0094078 A1 | 7/2002 | Edwards |
| 2018/0118075 A1* | 5/2018 | Schultz .................. B60N 3/103 |

* cited by examiner

VEHICLE CUPHOLDER ADAPTER FOR OVERSIZED BEVERAGE CONTAINER

RELATED APPLICATIONS

This application is a continuation in part of copending U.S. patent application Ser. No. 16/791,121 filed Feb. 14, 2020. which in turn is a continuation in part of U.S. patent application Ser. No. 16/573,063 filed Sep. 17, 2019, now U.S. Pat. No. 10,576,905, which in turn is a continuation in part of U.S. patent application Ser. No. 16/172,826 filed Oct. 28, 2018, now U.S. Pat. No. 10,717,396. Applicant is the owner of all of the foregoing applications. The disclosure and drawings of the foregoing applications are fully incorporated by reference herein.

BACKGROUND OF THE INVENTION

Current vehicles are furnished with cupholders that are designed to receive containers for beverages for the driver, for the front-row passenger and in many instances for second- and even third-row passengers. The cupholder usually has an open top, and a downwardly extending, substantially cylindrical sidewall that usually has some draft from the top to the bottom of the cupholder. The diameters of these cupholders greatly vary from one vehicle manufacturer to another.

A typical placement for the front-row cupholders is in a center console, between the driver's and passenger's seats. There may not be much distance between the centers of two adjacent cupholders collocated in the center console. As the size of cars continues to shrink, the real estate occupied by cupholders and the like grows tighter.

In a countervailing social trend, beverage containers, such as mugs, thermoses and bottles, have become larger. It is now a common occurrence that the consumer's preferred road beverage container won't fit into the cupholder. Further, in many instances, vehicle cupholders are so close together in the center console that two oversized beverage container holders could not be placed there. A need therefore exists for an adapter for an oversized beverage container that may be used in both center console cupholders at the same time. A need further exists for an oversized beverage container adapter that may be fitted into a vehicle cupholder of any of a variety of sizes.

SUMMARY OF THE INVENTION

According to one aspect of the invention, a cupholder adapter is provided for a large beverage container. The adapter includes a beverage container holder formed around a beverage container holder axis. An outer surface of a sidewall of the beverage container holder is disposed at or beyond a first radius from the beverage container holder axis. The cupholder adapter further includes a cupholder insert formed around a cupholder insert axis that is parallel to but displaced from the beverage container holder axis. The cupholder insert has a second sidewall which downwardly extends from the base of the beverage container holder. An outer surface of the second sidewall is disposed at, or within, a second radius from the cupholder insert axis, such that the second radius is smaller than the first radius.

Thus, the beverage container holder is not formed around the same axis as the cupholder insert. This intentional "eccentricity" permits a user to install two such cupholder adapters in adjacent center console cupholders in a vehicle, whereas forming the beverage container holder and the cupholder insert around the same axis would not permit this placement. A user therefore may support two oversized beverage containers from the same vehicle center console.

In one embodiment, the cupholder insert comprises a shell insert that downwardly depends from the base of the beverage container holder. The shell insert has a sidewall with an outer surface. The adapter further includes a first shell. The sidewall of the shell insert is adapted to fit inside of the sidewall of the first shell.

In one embodiment, a radially outwardly extending and substantially circumferential shell insert attachment rib is formed on the outer surface of the sidewall of the shell insert. A radially inwardly extending and substantially circumferential first shell attachment rib is formed on the inner surface of the sidewall of the first shell. During the attachment of the first shell to the shell insert, the shell insert attachment rib cams over the first shell attachment rib.

In one embodiment, the adapter further includes a plurality of shells adapted for use with the first shell. The plurality of shells include at least a second shell and a third shell. The second shell is adapted to be releasably attached to the first shell by fitting over the first shell. Means are provided to releasably affix the second shell to the first shell and to releasably affix the third shell to an assembly of the first shell and the second shell. The adapter is frictionally secured within a cup holder in a particular vehicle by (a) fitting the outer surface of the first shell to the inner wall of the selected cup holder, or (b) affixing one or more of the plurality of shells to the first shell and fitting an outer surface of an outermost one of the shells to the inner wall of the selected cup holder.

In one embodiment, the means for releasably affixing the second shell to the first shell comprises a substantially circumferential first shell outer attachment rib that radially outwardly extends from the outer surface of the first shell. The first shell outer attachment rib preferably is disposed near the top end of the first shell. A substantially circumferential second shell attachment rib radially inwardly extends from the inner surface of the second shell. This second shell attachment rib is disposed near the top end of the second shell. In the course of releasably affixing the second shell to the first shell, the second shell attachment rib cams over the first shell outer attachment rib.

In one embodiment, the beverage container holder is furnished with a handle slot to accommodate the handle of a mug or the like. The handle slot is formed in the first sidewall so as to downwardly extend from the top of the beverage container holder and is disposed around a handle slot center or radius drawn from the beverage container holder axis. The beverage container holder axis and the cupholder insert axis are separated from each other by a vector orthogonal to these axes. A preselected angle exists between the vector and the handle slot radius that is more than zero degrees and less than 180 degrees. Preferably this angle is selected from the range of about 90 degrees to about 175 degrees, and more preferably the angle is about 135 degrees. This permits two supported mugs to have handles that radially extend in two different directions when two adapters have been fitted to respective cupholders in a center console. The handles are conveniently positioned to be grasped by the hands of the driver and passenger.

According to another aspect of the invention, a cupholder adapter is provided for holding a device. The adapter includes a device holder that stands up from a base. A shell insert is formed around a vertical axis and is integrally molded with and downwardly extends from the base. The shell insert has a first sidewall that downwardly extends from the base. The adapter further includes a first shell that has a second sidewall, the first sidewall of the shell insert adapted to fit inside the second sidewall of the first shell. The adapter further has a plurality of shells, including at least second and third shells, that each have an outer surface, an upper end and a lower end. The second shell is adapted to be releasably attached to the first shell by fitting over the first shell. Means are provided for releasably affixing the second shell to the first shell, and means are provided to releasably affix the third shell to an assembly of the first shell and the second shell. In use, the adapter is frictionally secured to an inner wall of a vehicle cup holder, selected from a plurality of vehicle cup holders of possibly different sizes, by (a) fitting the outer surface of the first shell to the inner wall of the selected cup holder, or (b) affixing one or more of the plurality of shells to the first shell and then fitting an outer surface of the outermost one of the shells to the inner wall of the selected cup holder.

In one embodiment, the outer surface of the sidewall of the shell insert is disposed at or within a predetermined first radius from the axis. In this embodiment, the device being held is a large beverage container. The holder is formed on the vertical axis and has a third sidewall with an outer surface. This outer surface is disposed at or beyond a predetermined second radius from the axis that is larger than first radius. The beverage container holder has at least one vertical slot that downwardly extends from the top of the third sidewall, and which is adapted to receive a handle of the beverage container, which can for example be a mug.

In one embodiment, a radially outwardly extending and substantially circumferential shell insert attachment rib is formed on the outer surface of the shell insert sidewall. A radially inwardly extending and substantially circumferential first shell attachment rib is formed on the inner surface of the sidewall of the first shell, the shell insert attachment rib camming over the first shell attachment rib when the shell insert is assembled to the first shell.

In one embodiment, the means for releasably affixing the second shell to the first shell comprises a substantially circumferential first shell outer attachment rib that radially outwardly extends from the outer surface of the first shell so as to be disposed near the top end of the first shell, and a substantially circumferential second shell attachment rib that radially inwardly extends from the inner surface of the second shell and so as to be disposed near the top end of the second shell. The second shell attachment rib cams over the first shell outer attachment rib when the second shell is attached to the first shell.

The large beverage container adapter according to the invention permits a user to hold a large beverage container, such as a mug, cup or bottle, at one location in the vehicle interior, despite the large beverage container having a diameter that is too big to fit into the original equipment manufacturer (OEM) vehicle cup holder, and while keeping his or her hands free, thereby increasing safety. The "eccentric" embodiment introduced above, in which the cup holder insert axis is displaced from the beverage container holder axis, permits the deployment of two such large beverage container adapters in adjacent vehicle cup holders that have relatively tight spacing between them.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
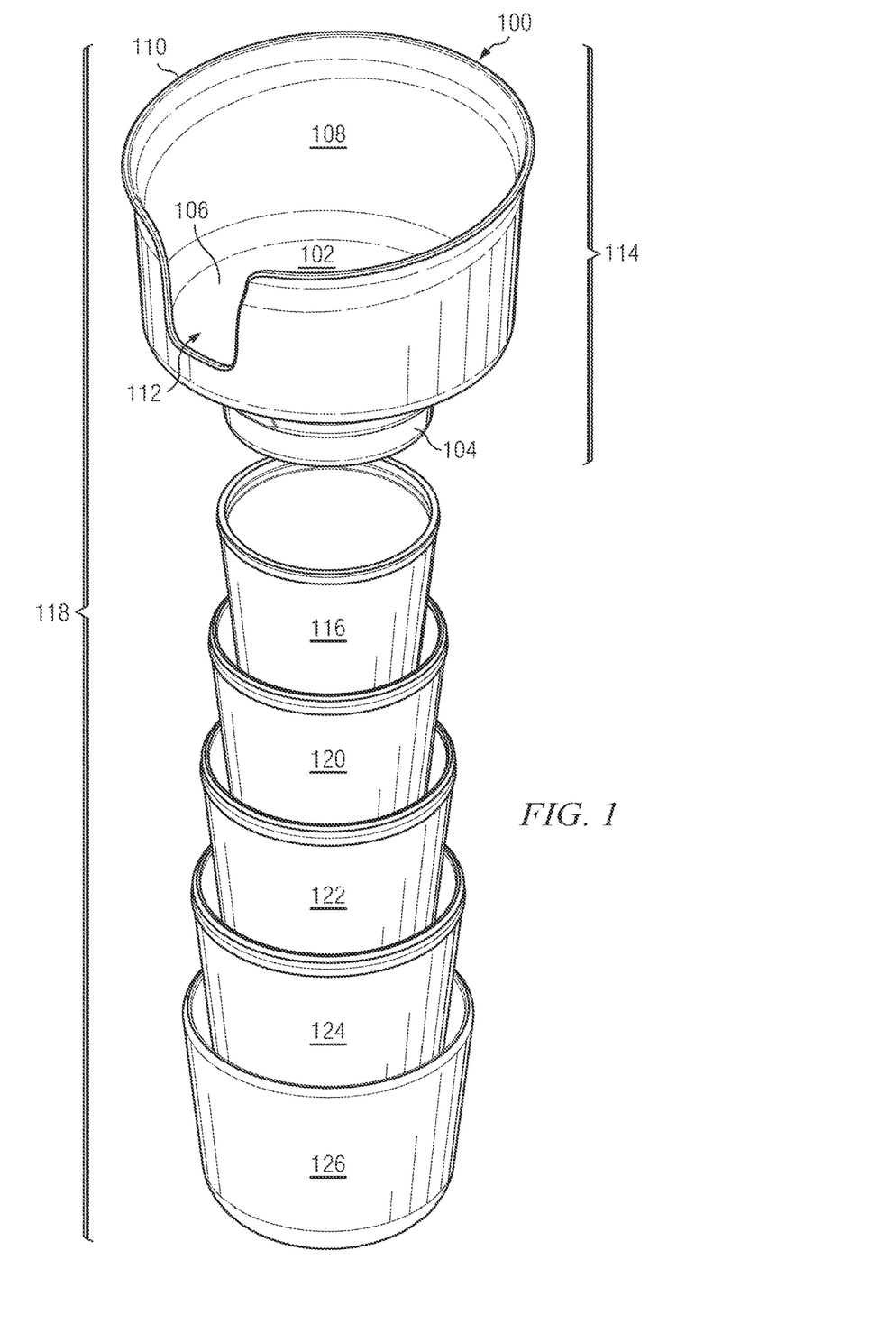
FIG. 1 is an exploded top perspective view of a first embodiment of our invention, showing an adapter insert, a first shell, and second through fifth shells, none, some or all of the second through fifth shells being used to fit to a particular OEM cup holder.

A first, "concentric" embodiment of the invention is introduced in FIG. 1. In this embodiment, a device holder 100 stands up from a base 102, while a shell insert 104 extends downwardly from base 102. In the illustrated embodiment, device holder 100 is adapted to hold an oversized beverage container, and in particular a mug. The base 102 preferably is formed as a floor 106 that extends across the interior to an inner surface of beverage holder sidewall 108. The sidewall 108 has a top margin 110, which may be flared as shown. A slot 112 downwardly extends from the top margin 110. This slot 112 is adapted to receive a mug handle, as will be illustrated in more detail below.

The device holder 100, base 102 and shell insert 104 together form an adapter insert 114. The adapter insert 114 is adapted to be assembled to a first shell 116. This is done by inserting a sidewall of the shell insert 104 into an interior of the first shell 116. Preferably, this is done at the factory. In the commercial embodiment the adapter insert 114 is snapped into the first shell 116, and this assembly is meant to be permanent.

The consumer is also provided with a plurality of further shells 120-126, which the consumer selectively uses in assembling an entire cupholder adapter 118 for use in fitting the adapter 118 to a particular vehicle cupholder. The further shells will include at least a second shell 120 and a third shell 122. In the illustrated embodiment, there are also a fourth shell 124 and a fifth shell 126. Shells 116, 120-126 are of progressively larger sizes, and the smaller ones fit into the larger ones in "Russian doll" fashion. Shell 116 fits into shell 120. An assembly of shell 116 and shell 120 fit into shell 122, and so on. As compared with a next smaller shell, a particular shell will have a larger maximum radius and a larger cavity depth. In the illustrated embodiment, the outer and inner surfaces of shells 116, 120-126 are formed as surfaces of rotation around a vertical axis (see FIG. 3), and are tapered from their top ends to their bottom ends. The container holder 100 is integrally molded with the base 102 and the shell insert 104 to form adapter insert 114. Adapter insert 114 and each of shells 116, 120-126 may be injection-molded from a tough plastic such as ABS.

Figure 2:
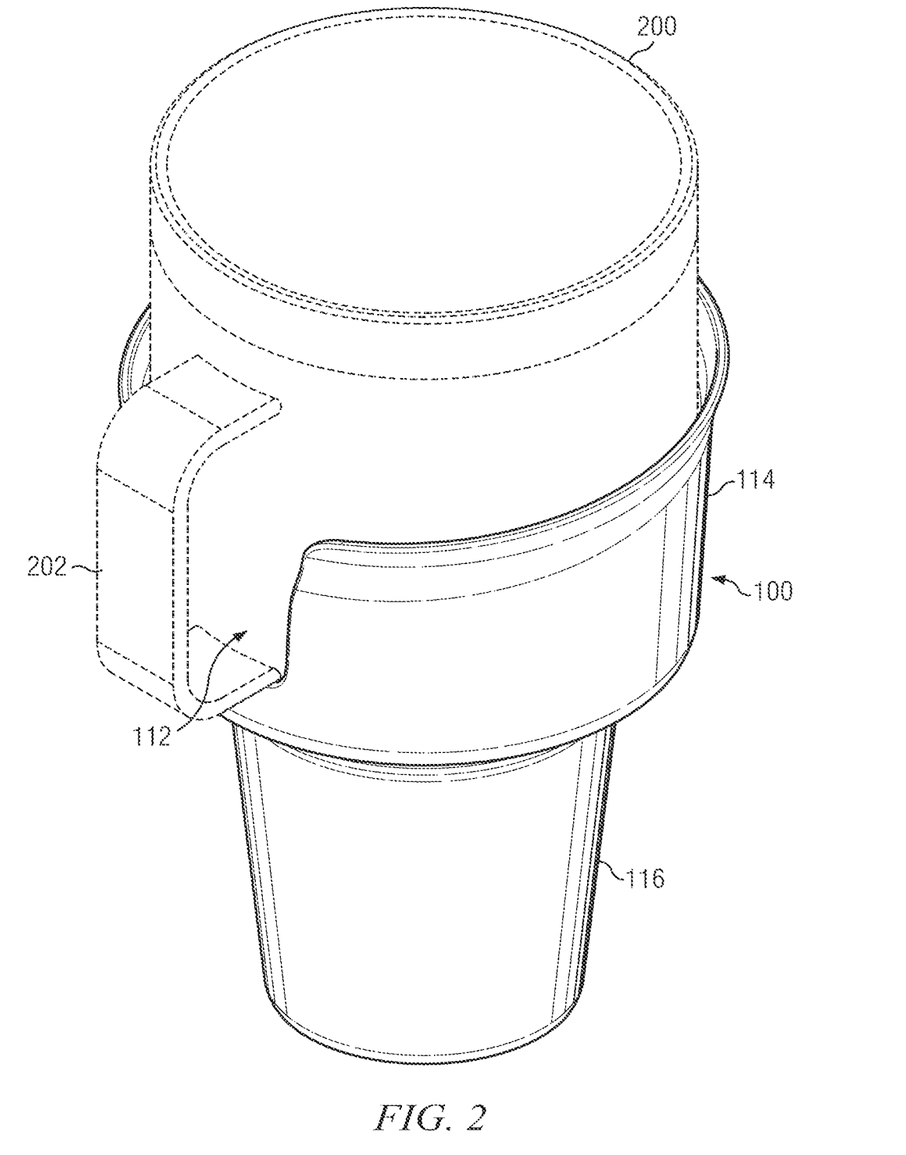
FIG. 2 is a top perspective view of an adapter insert and a first shell according to the first embodiment of our invention, an oversized mug being shown in dotted line.

In FIG. 2, the adapter insert 114 has been snapped into the first shell 116, and in this condition is suitable for interference-fitting into vehicle cupholders of a relatively small size. The container holder 100 is shown holding a handled mug 200, such as a 14 ounce YETI® insulated mug. The mug 200 has a handle 202 which is received in handle slot 112.

Figure 3:
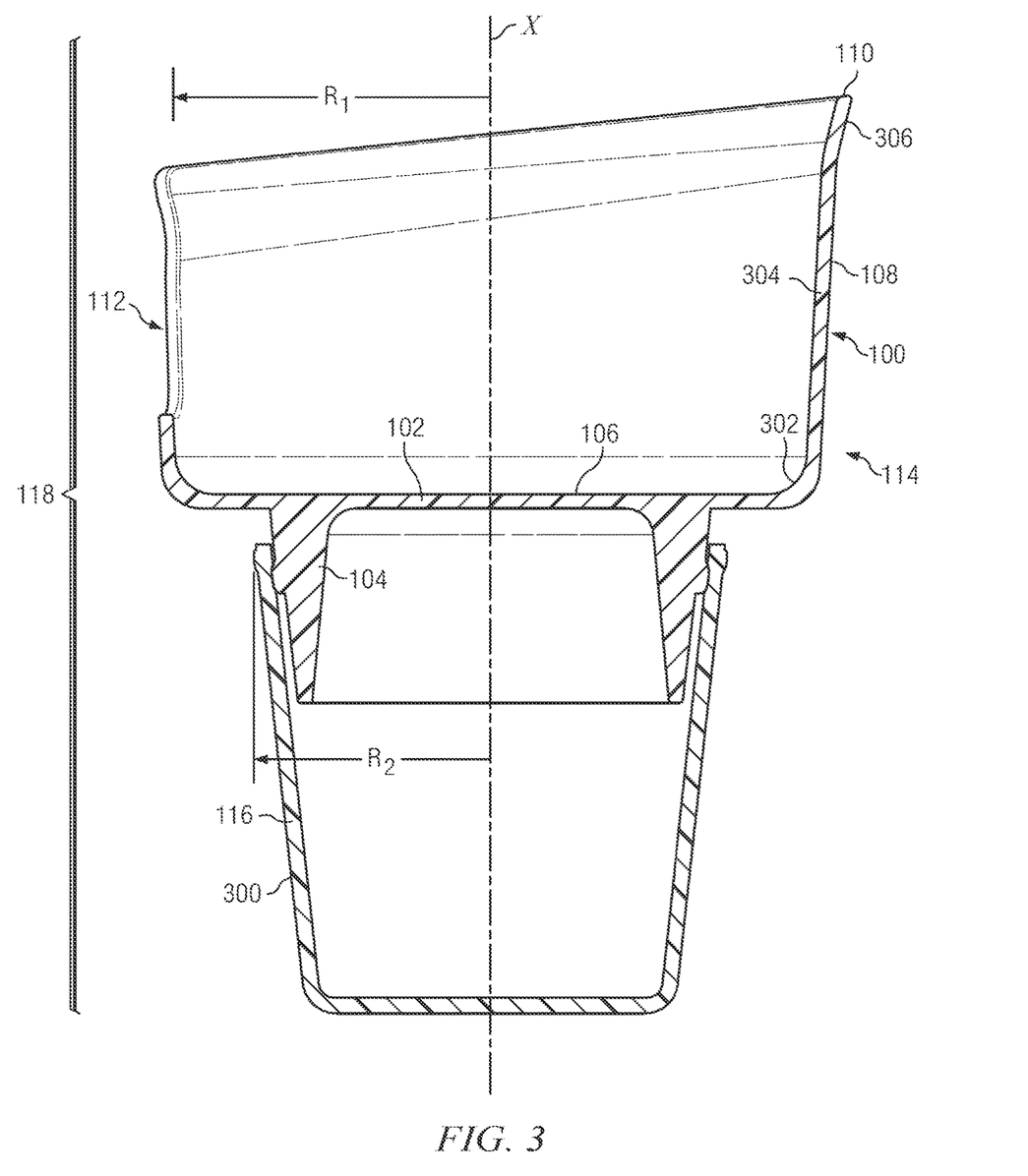
FIG. 3 is an axial sectional side view of the adapter insert and first shell shown in FIG. 2.

In FIG. 3, it can be seen that the entirety of the beverage container sidewall 108 is beyond a first radius $R_1$, drawn at a right angle from a vertical axis X. On the other hand, an outer surface 300 of the first shell 116 is entirely inside a second radius $R_2$, also drawn at a right angle from axis X. Radius $R_1$ is much greater than radius $R_2$. Radius $R_1$ is chosen to be large enough to accommodate the radius of an oversize, substantially cylindrical beverage container, and may be chosen to fit to such a container from a particular manufacturer. In the illustrated embodiment, radius $R_1$ is 2.15 in. However, device holder 100 may be designed to fit a container of another size or shape, such as one which is oval or rectangular, and may be designed to hold another object entirely, such as a cell phone, large tablet or other device or package, where such device or package has utility to a driver or passenger of the vehicle. While the invention has general application to any such device regardless of size, it is particularly suitable for those oversized objects that could not fit into an OEM cupholder.

Radius $R_2$, on the other hand, is selected to be a little larger than the radius of the smallest of the common cylindrical OEM cupholders now on the market, measured at their top ends. In the illustrated embodiment, radius $R_2$ is 1.51 in.

Holder sidewall 108 is joined to base 102 by a curved transition 302. A lower portion 304 of sidewall 108 is straight or has a slight upward and outward draft for injection molding purposes. An upper portion 306 of sidewall 108 is outwardly flared until sidewall top end 110 is reached. In the illustrated embodiment, the top margin 110 is not horizontal but rather conforms to an inclined plane that is at an angle of about six degrees to the horizontal. Top margin is tilted downward in the direction of slot 112. This slanted top margin, and the flared portion 306, assist a user in setting mug 200 into the holder 100 and withdrawing the mug 200 from the holder 100.

Figure 4:
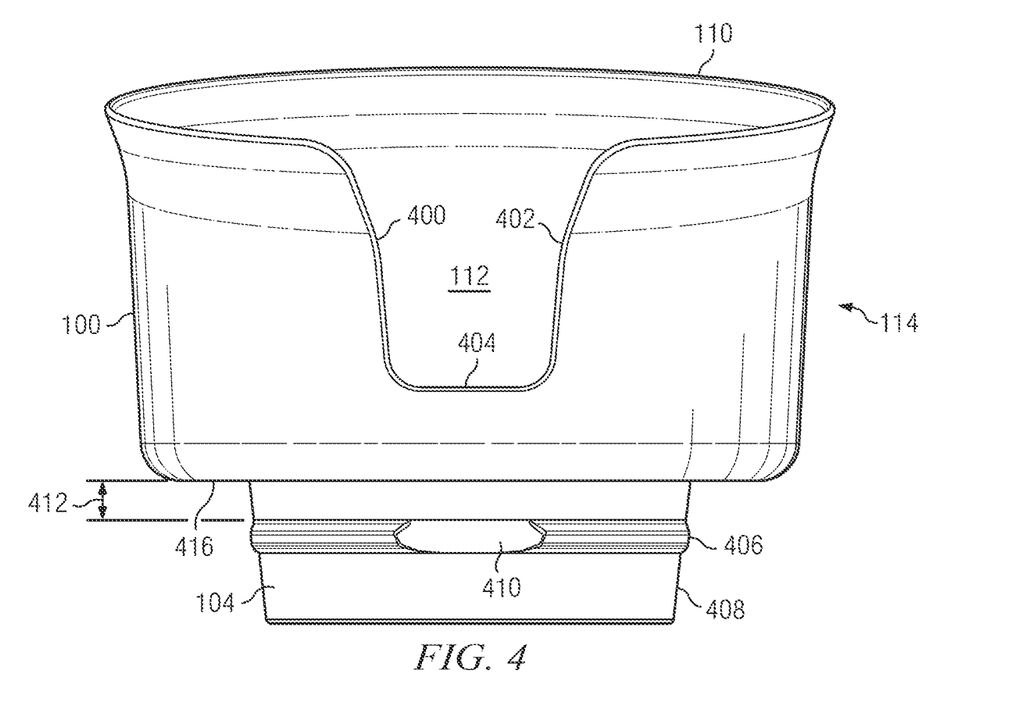
FIG. 4 is a front view of the adapter insert shown in FIG. 2.

As seen in FIG. 4, the slot 112 proceeds downward from top margin 110 until its side margins 400, 402, reach a bottom 404. In the illustrated embodiment, the width between margins 400, 402 is not constant, but increases as a function of the distance from bottom 404. This is a further aid to the user in registering the mug handle 202 into the slot 112.

FIG. 4 also illustrates the substantially (but not completely) circumferential attachment rib 406 that radially outwardly protrudes from the outer surface of sidewall 408 of shell insert 104. In the illustrated embodiment, the attachment rib 406 is not endless but instead is interrupted by two flat areas 410 (one shown; the other is 180 degrees spaced from the one appearing in FIG. 4). The flat areas 410 aid in injection-molding the adapter insert 114.

A top of the attachment rib 406 is downwardly spaced from a bottom 416 of the holder 100 by a distance 412, which in the illustrated embodiment is 0.34 in. This spacing makes sure that holder bottom 416 does not interfere in the installation of the assembled cupholder adapter 118 into a selected vehicle cupholder. Such interference might be a problem if the bottom 416 were too close to the mouth of the vehicle cupholder or to other features that may upwardly protrude from a center console of a vehicle.

Figure 5:
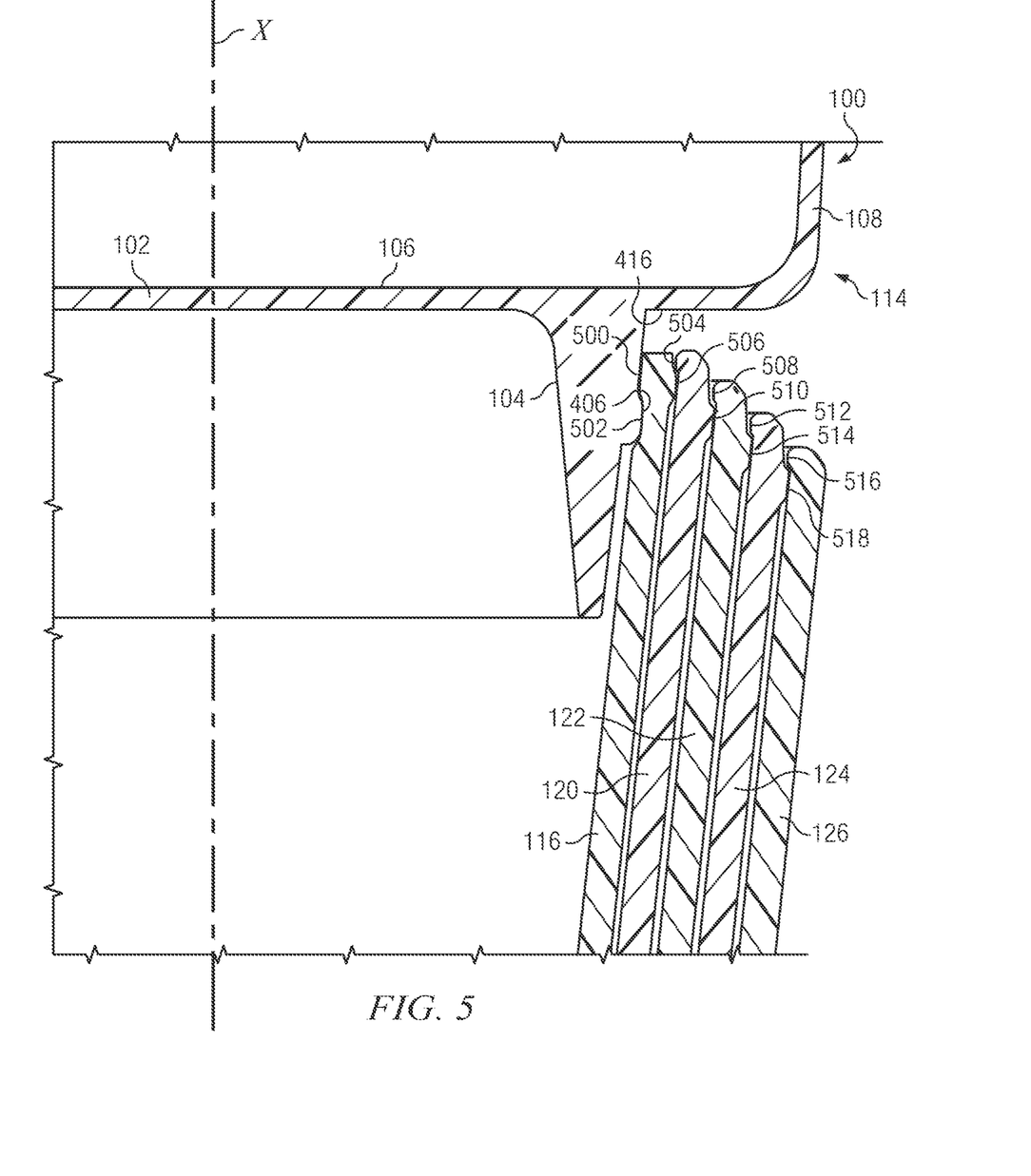
FIG. 5 is an axial sectional detail of the adapter insert and first shell, shown assembled to second through fifth shells.

As shown in FIG. 5, the shell insert 104 is affixed to the first shell 116 by means of attachment rib 406 interacting with an inwardly extending, circumferential first shell attachment rib 500. During assembly, the attachment rib 500 cams over shell insert attachment rib 406. In the illustrated embodiment, a circumferential channel or groove 502 is disposed immediately below attachment rib 500 and the shell insert attachment rib 406 will be received by groove 502. In this embodiment the shell insert 104 is snapped into the first shell 116 at the factory, and considerable force is needed to separate first shell 116 from shell insert 104 thereafter.

The user may releasably and sequentially affix none, some or all of shells 120-126 to the assembly of adapter insert 114 and first shell 116. In the illustrated embodiment, the means to do this are pairs of circumferential ribs on shells to be attached to each other. An inwardly extending circumferential rib on a (n+1)th shell, located at or near the top end of the shell, cams over an outwardly extending circumferential rib on the nth shell disposed to the interior of the (n+1)th shell. Hence, to assemble shell 120 to shell 116, the user cams inward circumferential attachment rib 504 of shell 120 over outer circumferential attachment rib 506 of shell 116. To assemble shell 122 to an assembly of shells 116 and 120, the user cams inner circumferential rib 508 of shell 122 over outer circumferential rib 510 of shell 120. To assemble shell 124 to an assembly of shells 116, 120 and 122, the user cams inner circumferential rib 512 of shell 124 over outer circumferential rib 514 of shell 122. Finally, to assemble shell 126 to an assembly of shells 116, 120, 122 and 124, the user cams inner circumferential rib 516 over outer circumferential rib 518 of shell 124.

On each of shells 116, 120-124, the position of the inner rib is close to the top end of the shell, while the position of the outer rib is a little spaced from the top end of the shell. In this fashion, as assembled, the top ends of shells 120-126 tend to be displaced downward from the top end of the shell immediately interior to it. This makes sure that as assembled, there is no interference between the outermost shell and the holder 100, even when the assembled adapter is friction-fit into a vehicle cupholder.

The separation force of any of shells 120-126 from the shell immediately interior to it should be less that the force necessary to separate shell insert 104 from first shell 116. This is because the consumer may decide to move the assembled adapter 118 from one vehicle to another in which the cup holders are of a different size. More, or fewer, of the shells 120-126 may be needed to fit to the other vehicle's cupholder(s).

While the preferred method of releasably affixing shells 120-126 to the assembly uses the ribs described above, these are not the only structures capable of doing this. Alternative methods and structures for releasably affixing the shells to each other include ribs positioned farther down on the sidewall, bumps, studs and slots, push-and-twist bayonet-style closures, and other structures and devices. Many examples of these methods and structures are given in U.S. Pat. No. 10,576,905 B1, owned by the applicant hereof and fully incorporated herein by reference.

Figure 6:
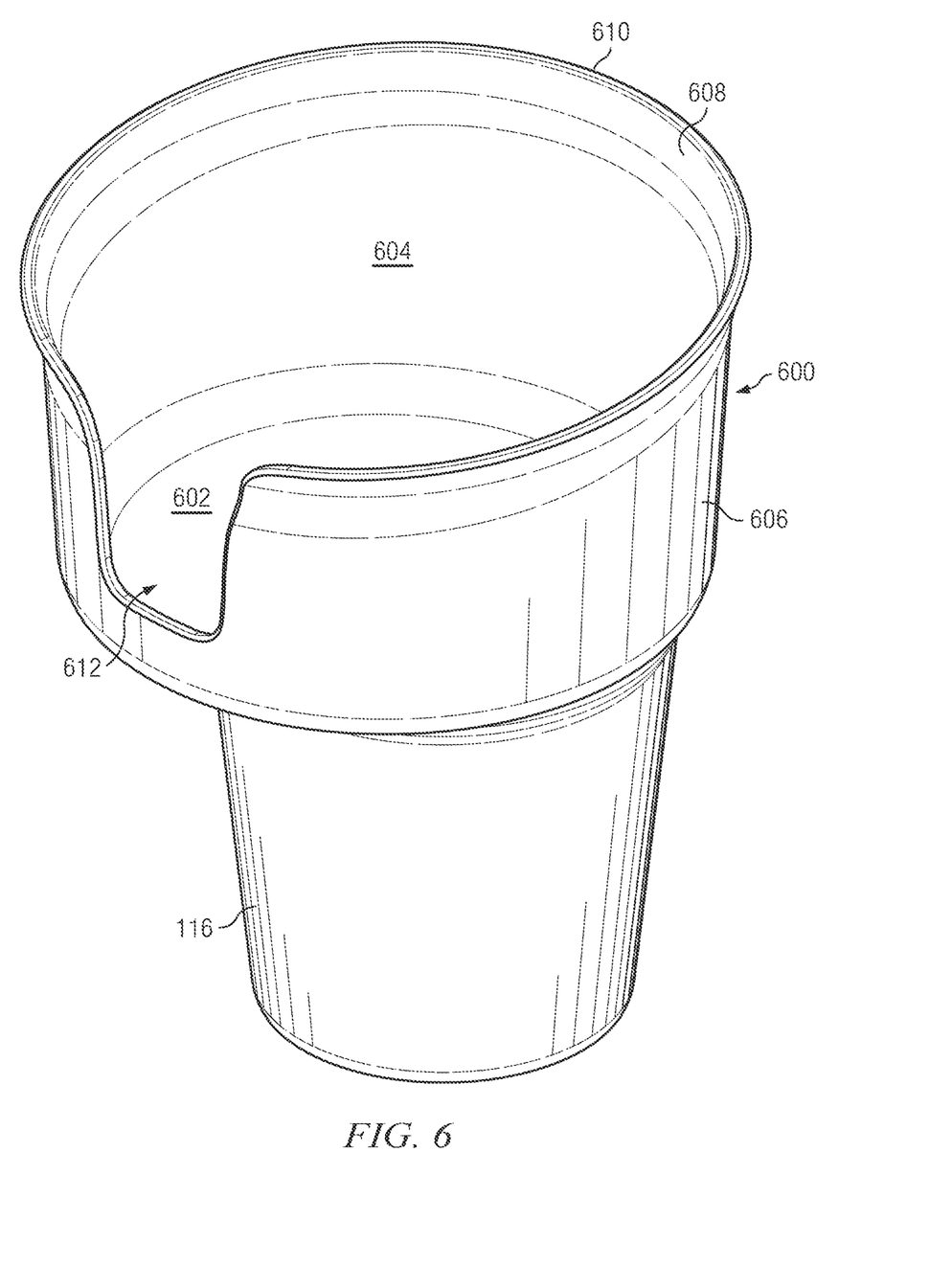
FIG. 6 is a top perspective view of a second embodiment of an adapter insert according to the invention, shown assembled to a first shell.

A second embodiment of this invention is shown in FIGS. 6-10. As seen in FIG. 6, a holder 600, which in the illustrated embodiment is a holder for a large beverage container, is permanently assembled to the first shell 116, as before, using the same rib structures. Holder 600 is generally similar to holder 100 in the first embodiment. Holder 600 upwardly extends from a base 602. A sidewall 604 of the holder 600 has a lower portion 606 which is substantially cylindrical and an upper portion 608 that is outwardly flared. A top margin 610 of the holder 600 is tilted away from a horizontal plane and downwardly toward a handle slot 612, the sidewalls of which are spaced apart from each other by an increasing amount as one approaches holder top margin 610.

Figure 7:
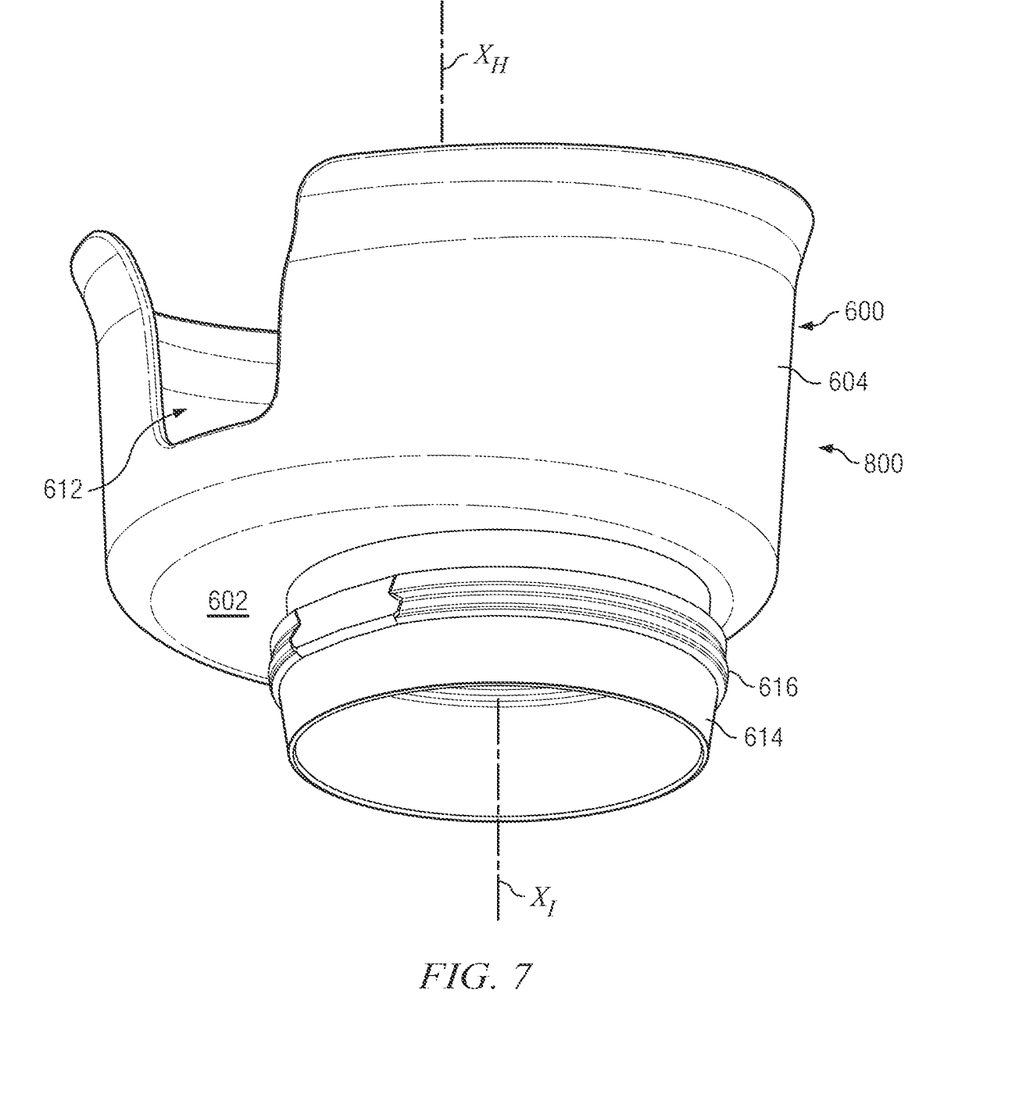
FIG. 7 is a bottom perspective view of the adapter insert shown in FIG. 6.

As shown by FIG. 7, and as before, a shell insert 614 downwardly extends from the base 602 and has a substantially circumferential attachment rib 616 that outwardly extends from an outer surface of the shell insert 614. But FIG. 7 is a good illustration of the principal difference of this embodiment from the first one: instead of a single axis X, a holder axis $X_H$ is offset from but parallel to an insert axis $X_I$.

Figure 8:
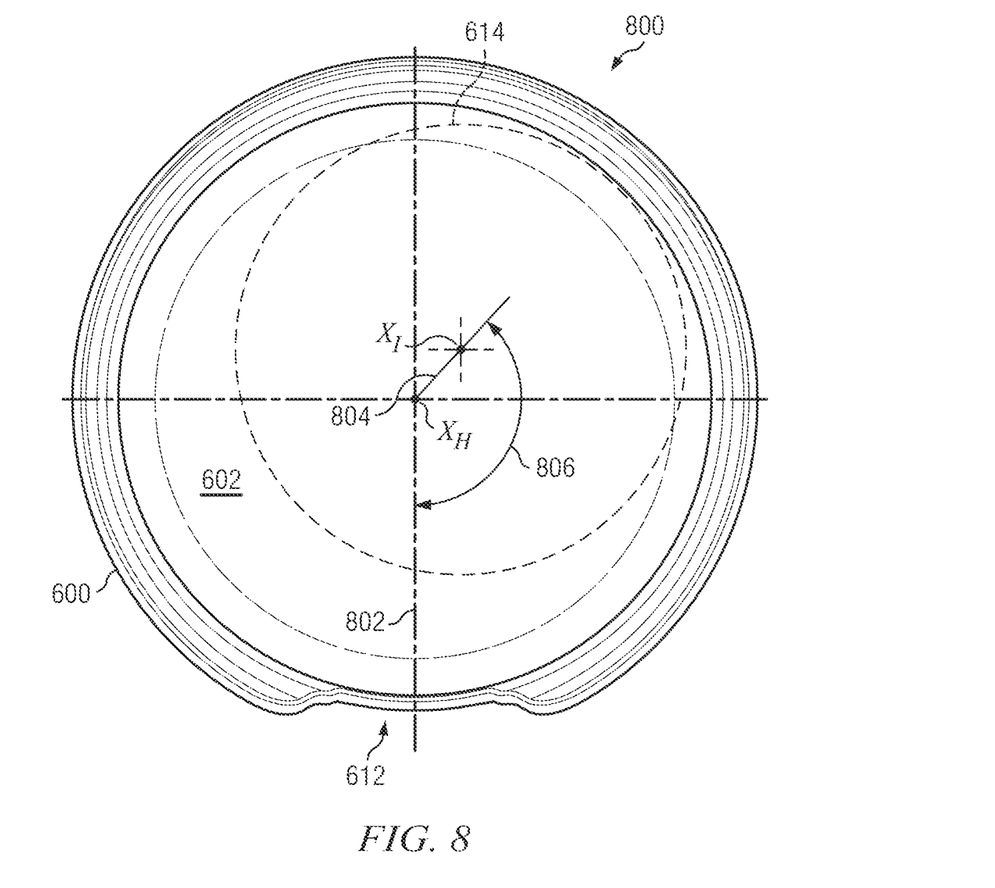
FIG. 8 is a top view of the adapter insert shown in FIG. 6 certain details of a shell insert thereof being shown in dotted line.

FIG. 8 is a top view of the "eccentric" adapter insert 800, which comprises large beverage container holder 600, base 602 and shell insert 614. A slot radius 802 is drawn from axis $X_H$ through the center of the handle slot 612. A vector 804 extends from axis $X_H$ to axis $X_I$. In the illustrated embodiment, the length of the vector 804 is 0.42 in., and the angle 806 that it makes with radius 802 is 135 degrees. This offset and angle will change depending on the degree to which holder 600 exceeds first shell 116 in size; the bigger holder 600 is, the more offset will be needed. In general, angle 806 can be more than zero and less than 180 degrees, and more preferably falls between about 90 degrees and about 175 degrees.

Figure 9:
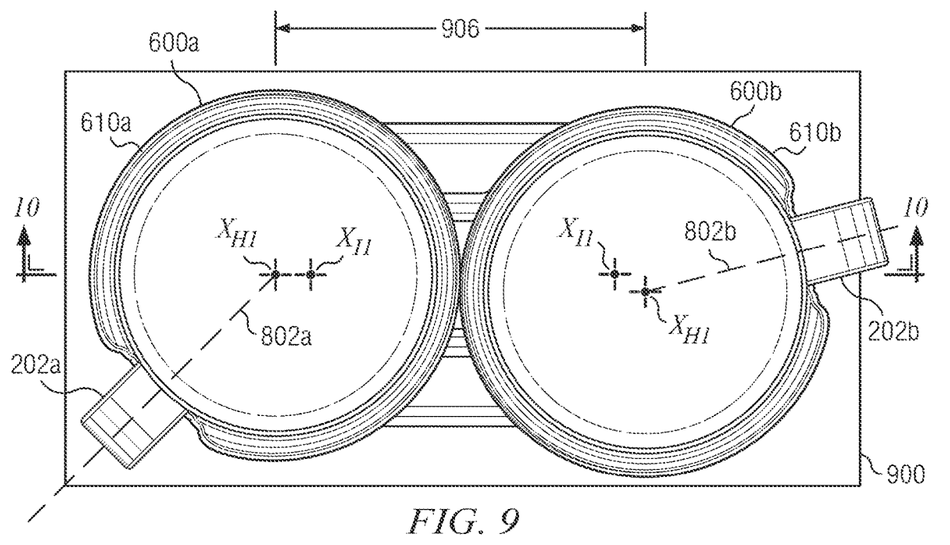
FIG. 9 is a top view of two adapter inserts, as assembled to respective assemblies of first through third shells, as fitted into respective cupholders in the center console of a 2017 Mazda CX-5 and as shown holding two oversized mugs.
Figure 10:
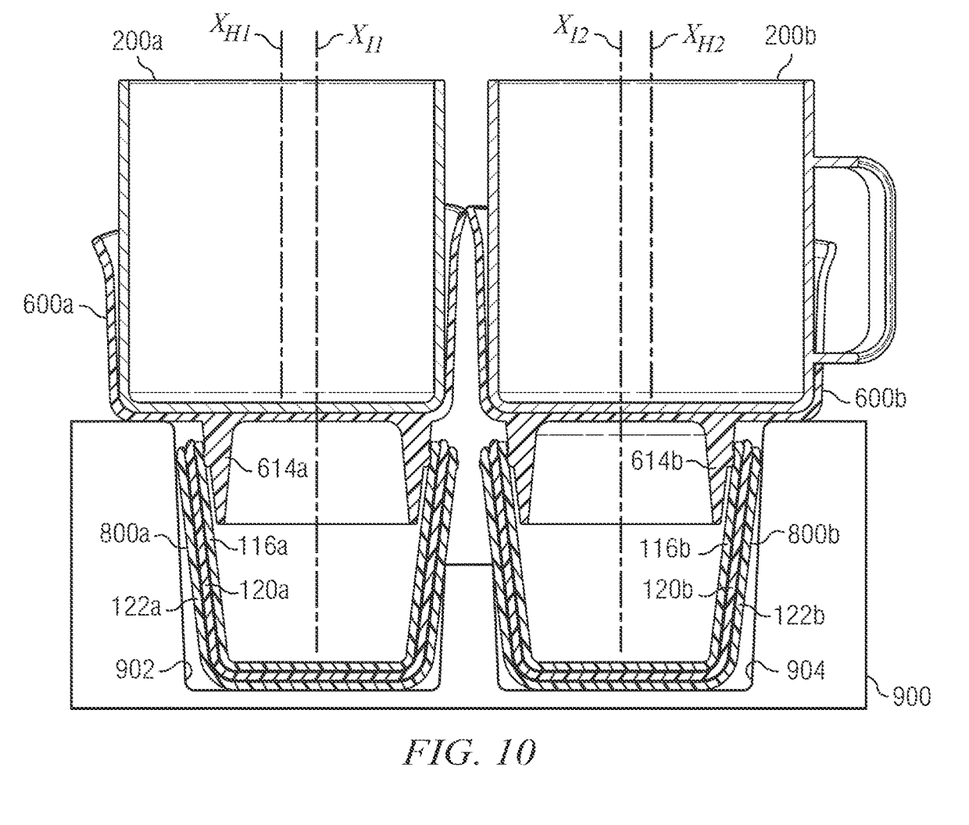
FIG. 10 is a schematic elevational view of the mugs, inserts, bases, shells and console shown in FIG. 9.

FIGS. 9 and 10 are top and side views of a center console 900 of a 2017 Mazda CX-5, shown with two mugs 200*a*, 200*b* installed into two adjacent cupholders 902 and 904. The adapters will have shell inserts on axes $X_{11}$ and $X_{12}$ that are aligned to the axes of the OEM cupholders 902 and 904. A spacing 906 between axes $X_{11}$ and $X_{12}$ will be less than the diameter across top margin 610*a* or holder top margin 610*b*. Therefore, without the axial offsets of this embodiment, the holders 600*a*, 600*b* would not be able to both fit in the same center console.

This particular center console 900 is arranged so that cupholders 902 and 904 are in an inboard/outboard direction in relation to each other. Holders 610*a*, 610*b* may be rotated around insert axes $X_{11}$ and $X_{12}$ until their top margins 610*a*, 610*b* touch, as shown.

A driver will be positioned to the left of holder 600*a*, and a passenger will be positioned to the right of holder 600*b*. It is useful to have the handles 202*a*, 202*b* point somewhat toward the driver and passenger. Angle 806 permits this to happen. In one configuration permitted by this geometry, handle 202*b* can be positioned at 15 degrees from the transverse direction, while handle 202*a* can at the same time be positioned at 45 degrees from the transverse direction. Increasing the angle of one of the mug handles will permit a decrease in the other angle.

In the installation seen in FIGS. 9 and 10, two adapter assemblies are shown, both including an adapter insert 800*a*, 800*b*. Adapter insert 800*a*, including holder 600*a* and shell insert 614 a, has been snapped into a first shell 116*a*. A second shell 120*a* has been removably affixed to the assembly of adapter insert 800*a* and first shell 116*a*, and a third shell 122*a* has been removably affixed to the assembly of adapter insert 800*a*, first shell 116*a* and second shell 120*a*. This assembly has been friction-fitted to the sidewall of driver's side vehicle cupholder 902. In like fashion, an assembly of adapter insert 800*b* (including second holder 600*b* and shell insert 614*b*), first shell 116*b*, second shell 120*b* and third shell 122*b* has been friction-fitted to the sidewall of the passenger's side vehicle cupholder 904. During the friction-fitting or installation, the holders 600*a*, 600*b* may be rotated around respective cupholder insert axes $X_{11}$ and $X_{12}$ until the desired mug handle orientations are achieved.

In summary, a vehicle cupholder adapter for an object, such as an oversized beverage container, has been illustrated and described. A collection of shells may be selectively used, Russian-doll fashion, to fit the adapter to any common OEM cupholder. An embodiment in which the axis of the holder is offset from the axis of the cupholder insert may be used to mount two oversized containers within a compact two-position vehicle center console.

While illustrated embodiments of the present invention have been described and illustrated in the appended drawings, the present invention is not limited thereto but only by the scope and spirit of the appended claims.

We claim:

1. A cupholder adapter for holding a large beverage container, the adapter comprising:
   a beverage container holder formed around a beverage container holder axis, the beverage container holder having a base and a first sidewall upwardly extending from the base, the first sidewall having an outer surface, the outer surface of the first sidewall disposed at or beyond a first radius from the beverage container holder axis;
   a cupholder insert downwardly extending from the base of the beverage container holder, the cupholder insert formed around a cupholder insert axis that is parallel to but displaced from the beverage container holder axis, the beverage container holder axis and the cupholder insert axis being separated from each other by a vector orthogonal to the beverage container holder axis, the cupholder insert having a second sidewall which downwardly extends from the base of the beverage container holder, an outer surface of the second sidewall disposed at or within a second radius from the cupholder insert axis, the second radius being smaller than the first radius, wherein
   the second sidewall is sized and shaped to fit into a vehicle cupholder.

2. The adapter of claim 1, wherein the cupholder insert comprises a shell insert downwardly depending from the base of beverage container holder, the shell insert having a shell insert sidewall with an outer surface; and
   a first shell, a sidewall of the first shell being the second sidewall of the cupholder insert, the shell insert sidewall adapted to fit inside of the sidewall of the first shell.

3. The adapter of claim 2, wherein a radially outwardly extending and substantially circumferential shell insert attachment rib is formed on the outer surface of the sidewall of the shell insert, a radially inwardly extending and substantially circumferential first shell attachment rib formed on the inner surface of the sidewall of the first shell, the shell insert attachment rib camming over the first shell attachment rib when the shell insert is assembled to the first shell.

4. The adapter of claim 3, wherein the shell insert attachment rib is interrupted at at least one angular location relative to the cupholder insert axis.

5. The adapter of claim 4, wherein the shell insert attachment rib is interrupted at two angularly spaced apart locations relative to the cupholder insert axis.

6. The adapter of claim 2, further comprising:
   a plurality of shells adapted for selective use with the first shell, the plurality of shells including second and third shells, each of the plurality of shells having an outer surface with an upper end and a lower end, the second shell adapted to be releasably attached to the first shell by fitting over the first shell; and means for releasably affixing the second shell to the first shell and means for releasably affixing the third shell to an assembly of the second shell and the first shell, wherein the adapter is frictionally secured within a selected cup holder selected from a plurality of vehicle cup holders each having an inner wall, by (a) fitting the outer surface of the first shell to the inner wall of the selected cup holder, or (b) affixing one or more of the plurality of shells to the first shell and fitting an outer surface of an outermost one of the shells to the inner wall of the selected cup holder.

7. The adapter of claim 6, wherein the sidewall of the first shell has an outer surface and a top end, the second shell having an inner surface and a top end, the means for releasably affixing the second shell to the first shell comprising a substantially circumferential first shell outer attachment rib radially outwardly extending from the outer surface of the first shell, the first shell outer attachment rib disposed near the top end of the first shell; and a substantially circumferential second shell attachment rib radially inwardly extending from the inner surface of the second shell, the second shell attachment rib disposed near the top end of the second shell, the second shell attachment rib camming over the first shell outer attachment rib when the second shell is assembled to the first shell.

8. The adapter of claim 1, wherein the outer surface of the second sidewall is formed as a surface of rotation around the cupholder insert axis.

9. The adapter of claim 1, wherein the first sidewall of the beverage container holder has a first substantially cylindrical section upwardly extending from the base, and a second, radially outwardly flared section upwardly extending from the first section.

10. The adapter of claim 1, wherein the first sidewall extends upwardly to a top of the beverage container holder, a handle slot formed in the first sidewall to downwardly extend from the top of the beverage container holder and disposed around a handle slot center drawn from the beverage container holder axis, a preselected angle between the vector and the handle slot center being more than zero degrees and less than 180 degrees.

11. The adapter of claim 10, wherein the preselected angle is more than about 90 degrees and less than about 175 degrees.

12. The adapter of claim 11, wherein the preselected angle is about 135 degrees.

13. The adapter of claim 10, wherein the at least one vertical slot has a bottom, a first edge of the at least one vertical slot extending from the bottom to the top of the first sidewall, a second edge of the at least one vertical slot extending from the bottom to the top of the first sidewall, the first edge diverging from the second edge as a function of distance from the bottom such that the at least one vertical slot is wider at the top of the first sidewall than it is on the bottom.

14. A cupholder adapter for holding a device, the adapter comprising:

a device holder, the device holder having a base and a holder sidewall standing up from the base;

a shell insert integrally molded with the device holder and downwardly extending from the base of the device holder, the shell insert formed around a vertical axis, the shell insert having a first sidewall which downwardly extends from the base of the device holder, a first shell having a second sidewall, the first sidewall of the shell insert adapted to fit inside of the second sidewall of the first shell;

a plurality of shells adapted for selective use with the first shell, the plurality of shells including at least second and third shells, each of the plurality of shells having an outer surface with an upper end and a lower end, the second shell adapted to be releasably attached to the first shell by fitting over the first shell; and means for releasably affixing the second shell to the first shell and means for releasably affixing the third shell to an assembly of the second shell and the first shell, wherein the adapter is frictionally secured within a selected cup holder selected from a plurality of vehicle cup holders each having an inner wall, by (a) fitting the outer surface of the first shell to the inner wall of the selected cup holder, or (b) affixing one or more of the plurality of shells to the first shell and fitting an outer surface of an outermost one of the shells to the inner wall of the selected cup holder; wherein the second sidewall has an inner surface, a radially outwardly extending and substantially circumferential insert attachment rib being formed on the outer surface of the first sidewall of the shell insert, a radially inwardly extending and substantially circumferential first shell attachment rib formed on the inner surface of the second sidewall of the first shell, the shell insert attachment rib axially camming over the first shell attachment rib when the shell insert is assembled to the first shell.

15. The adapter of claim 14, wherein an outer surface of the first sidewall of the shell insert is disposed within a predetermined first radius from the axis, the device being a large beverage container, the holder formed on the vertical axis, the holder sidewall upwardly extending from the base to a top of the holder sidewall, the holder sidewall having an outer surface, the outer surface of the holder sidewall disposed at or farther from a predetermined second radius from the axis, the second radius being larger than the first radius, the device holder having at least one vertical slot that downwardly extends from the top of the holder sidewall and which is adapted to receive a handle of the beverage container.

16. The adapter of claim 15, wherein the holder sidewall has a first substantially cylindrical section upwardly extending from the base, and a second, radially outwardly flared section upwardly extending from the first section.

17. The adapter of claim 15, wherein the at least one vertical slot has a bottom, a first edge of the at least one vertical slot extending from the bottom to the top of the holder sidewall, a second edge of the at least one vertical slot extending from the bottom to the top of the holder sidewall, the first edge diverging from the second edge as a function of distance from the bottom such that the at least one vertical slot is wider at the top of the holder sidewall than it is on the bottom.

18. The adapter of claim 14, wherein the second sidewall of the first shell has an outer surface and a top end, the second shell having an inner surface and a top end, the means for releasably affixing the second shell to the first shell comprising a first circumferential outer attachment rib radially outwardly extending from the outer surface of the second sidewall of the first shell, the first outer attachment rib disposed near the top end of the second sidewall of the first shell; and a second circumferential attachment rib radially inwardly extending from the inner surface of the second shell, the second attachment rib disposed near the top end of the second shell, the second attachment rib camming over the first outer attachment rib when the second shell is attached to the first shell.

* * * * *